United States Patent
Ochiai et al.

(10) Patent No.: US 10,168,541 B2
(45) Date of Patent: Jan. 1, 2019

(54) THREE DIMENSIONAL DISPLAY DEVICE COMPRISING A BUS LEAD WIRE CONNECTED TO FIRST AND SECOND BUS LINES VIA A BRANCH POINT AND LIQUID CRYSTAL PANEL

(71) Applicant: Japan Display Inc., Tokyo (JP)

(72) Inventors: Takahiro Ochiai, Tokyo (JP); Keita Sasanuma, Tokyo (JP); Syou Yanagisawa, Tokyo (JP); Shinichirou Oka, Tokyo (JP); Kouichi Shirai, Tokyo (JP)

(73) Assignee: Japan Display Inc., Tokyo (JP)

( * ) Notice: Subject to any disclaimer, the term of this patent is extended or adjusted under 35 U.S.C. 154(b) by 213 days.

(21) Appl. No.: 15/082,412

(22) Filed: Mar. 28, 2016

(65) Prior Publication Data

US 2016/0291338 A1 Oct. 6, 2016

(30) Foreign Application Priority Data

Mar. 31, 2015 (JP) ................................. 2015-073184

(51) Int. Cl.
  *G02B 27/22* (2018.01)
  *G02F 1/1345* (2006.01)
  *G02F 1/1343* (2006.01)
(52) U.S. Cl.
  CPC ....... *G02B 27/2214* (2013.01); *G02F 1/1345* (2013.01); *G02F 1/134309* (2013.01)
(58) Field of Classification Search
  None
  See application file for complete search history.

(56) References Cited

U.S. PATENT DOCUMENTS

2006/0215262 A1   9/2006   Kim
2009/0002267 A1   1/2009   Nam et al.
(Continued)

FOREIGN PATENT DOCUMENTS

JP    2006-189766 A    7/2006
JP       2009-9081 A    1/2009
WO    2014/141813 A1    9/2014

OTHER PUBLICATIONS

Japanese Office Action dated Oct. 30, 2018 for the corresponding Japanese Patent Application No. 2015-073184, with English translation.

*Primary Examiner* — Paul Lee
(74) *Attorney, Agent, or Firm* — Typha IP LLC

(57) ABSTRACT

A three-dimensional display device prevents a barrier wire breakage failure and includes a parallax barrier panel resistant to static electricity. The 3D display device has a liquid crystal parallax barrier panel disposed over a display panel. The parallax barrier panel has a first substrate having an electrode formed flat thereon and a second substrate having a display area, the first substrate and the second substrate having liquid crystal sandwiched therebetween. The second substrate has barrier electrodes extending in a first direction and arrayed at a first pitch in a second direction, has a first bus electrode extending in the second direction outside the display area along a first side thereof, and has a second bus electrode extending in the second direction outside the display area along a second side thereof opposite to the first side. The barrier electrodes are connected to the first and the second bus electrodes.

6 Claims, 15 Drawing Sheets

(56) References Cited

U.S. PATENT DOCUMENTS

| | | | |
|---|---|---|---|
| 2011/0157496 A1* | 6/2011 | Im | G02B 27/2214 349/15 |
| 2012/0105750 A1* | 5/2012 | Yoon, II | G09G 3/003 349/15 |
| 2012/0162550 A1* | 6/2012 | Jeong | G02F 1/134309 349/15 |
| 2013/0229587 A1* | 9/2013 | Takama | G02B 27/22 349/33 |
| 2013/0342586 A1* | 12/2013 | Kim | G02F 1/1313 345/690 |
| 2015/0346560 A1* | 12/2015 | Song | G02F 1/1345 349/15 |

* cited by examiner

THREE DIMENSIONAL DISPLAY DEVICE COMPRISING A BUS LEAD WIRE CONNECTED TO FIRST AND SECOND BUS LINES VIA A BRANCH POINT AND LIQUID CRYSTAL PANEL

CLAIM OF PRIORITY

The present application claims priority from Japanese Patent Application JP 2015-73184 filed on Mar. 31, 2015, the content of which is hereby incorporated by reference into this application.

BACKGROUND OF THE INVENTION

1. Field of the Invention

The present invention relates to a display device. More particularly, the invention relates to a three-dimensional display device that uses a parallax barrier panel with liquid crystal.

2. Description of the Related Art

The parallax barrier method is a well-known three-dimensional (3D) image display method. This is a method in which an image for the field of view of the right eye and an image for the field of view of the left eye are displayed alternately behind a so-called parallax barrier panel having a plurality of fine slits in a longitudinal direction, the alternated images constituting a 3D image through the parallax barrier.

The parallax barrier panel is formed by having liquid crystal sandwiched between a barrier substrate having barrier electrodes and a common substrate with a common electrode. The parallax barrier panel using liquid crystal offers the advantage of presenting 3D image display when impressed with a barrier signal for driving the liquid crystal and providing 2D image display when not impressed with the barrier signal.

JP-A-2009-9081 discloses a parallax barrier method in which a two-layer barrier electrode structure has its barrier side and its transmission side alternated at short intervals to reduce a decrease in transmission factor incurred by the parallax barrier panel.

JP-A-2006-189766 discloses a structure in which both sides of barrier electrodes are provided with a first transmission electrode and a second transmission electrode which are impressed with a transmission signal and a barrier signal alternately in each frame to permit deep-looking 3D display while reducing a decrease in transmission factor.

SUMMARY OF THE INVENTION

Over the barrier substrate of the parallax barrier panel, barrier electrodes are formed across a display area. Conventionally, a bus electrode is formed on one side of the display area. The barrier electrodes extend from the bus electrode in a manner crossing the display area. With this method, if any barrier electrode breaks halfway, the portion downstream of the broken part loses the barrier function, which renders the barrier panel defective.

An object of the present invention is to forestall a barrier electrode breakage failure in a parallax barrier and to prevent a bridge wire breakage caused primarily by static electricity in the multilayer wiring of bus electrodes for supplying a barrier signal to barrier electrodes.

In solving the above-described problem, the present invention proposes supplying the same barrier electrode with the barrier signal from the bus electrodes formed on both sides of the display area. In this structure, even if a barrier electrode breaks, the breakage is limited to that part only. Such a failure is negligible in most cases. This enables production yield to increase significantly.

However, where the barrier electrodes are supplied with a voltage from both sides of the display area, providing terminals individually to the bus terminals on both sides requires installing an increasing number of terminals. To reduce the growing terminal count, one terminal may be arranged to feed the signal to multiple bus terminals that will carry the same voltage on both sides of the display area. This structure necessitates multilayer wiring. In a multilayer wiring structure, bridges are formed over adjacent bus electrode lead wires via an interlayer insulating film. These bridge wires are formed at the same time as the barrier electrodes for purposes of cost reduction. The barrier electrodes are constituted by indium tin oxide (ITO).

ITO-constituted bridge wires have higher resistance than the metals making up the bus electrodes and other parts. This means that if, for example, a static electrical charge enters a terminal, the power caused by the resulting current is consumed almost exclusively at this bridge part. This leads to a bride wire breakage.

The present invention thus proposes not forming bridge wires on either side of the bus electrodes across the display area so that the power caused by static electricity will not concentrate on any bridge wire, thereby preventing bridge wire breakage. Specific means for implementing the present invention are as follows:

(1) According to one embodiment of the present invention, there is provided a three-dimensional display device having a liquid crystal parallax barrier panel disposed over a display panel. The parallax barrier panel has a first substrate having an electrode formed flat thereon and a second substrate having a display area, the first substrate and the second substrate having liquid crystal sandwiched therebetween. The second substrate has barrier electrodes extending in a first direction and arrayed at a first pitch in a second direction, has a first bus electrode extending in the second direction outside the display area along a first side thereof, and has a second bus electrode extending in the second direction outside the display area along a second side thereof opposite to the first side. The barrier electrodes are connected to the first and the second bus electrodes.

(2) Preferably in the three-dimensional display device described in the paragraph (1) above, each of terminals for supplying a barrier signal to the barrier electrodes may have a bus electrode lead wire extending in the direction of the display area to branch at a branch point into the first bus electrode in a third direction and into the second bus electrode in a fourth direction. The first bus electrode branching in the third direction may remain in the same layer as the bus electrode lead wires while extending in the second direction along the first side of the display area.

(3) Preferably in the three-dimensional display device described in the paragraph (2) above, the second bus electrode may be connected via a bridge wire to another layer before being connected again to the same layer as the bus electrode lead wires and extending in the second direction along the second side of the display area.

(4) Preferably in the three-dimensional display device described in the paragraph (3) above, the bridge wire may be constituted by indium tin oxide.

(5) According to another embodiment of the present invention, there is provided a three-dimensional display device including a liquid crystal parallax barrier panel disposed over a display panel. The parallax barrier panel has a first substrate having an electrode formed flat thereon and a second substrate having a display area, the first substrate and the second substrate having liquid crystal sandwiched therebetween. The second substrate has first barrier electrodes extending in a first direction and arrayed at a first pitch in a second direction, and has second barrier electrodes extending in the first direction and arrayed at the first pitch in the second direction, the first barrier electrodes and the second barrier electrodes having an interlayer insulating film sandwiched therebetween. Gaps between the first barrier electrodes are seen blocked by the second barrier electrodes when viewed in a plan view. Each of the first barrier electrodes is paired with one of the second barrier electrodes which is adjacent thereto when viewed in a plan view to form a barrier electrode couple, the paired first and second barrier electrodes being impressed with the same potential. The barrier electrode couples are arrayed at the first pitch in the second direction. A first bus electrode extends in the second direction outside the display area along a first side thereof. A second bus electrode extends in the second direction outside the display area along a second side thereof opposite to the first side. The first barrier electrode of each barrier electrode couple is connected to the first bus electrode and to the second bus electrode.

(6) Preferably in the three-dimensional display device described in the paragraph (5) above, each of terminals for supplying a barrier signal to the barrier electrodes may have a bus electrode lead wire extending in the direction of the display area to branch at a branch point into the first bus electrode in a third direction and into the second bus electrode in a fourth direction. The first bus electrode branching in the third direction may remain in the same layer as the bus electrode lead wires while extending in the second direction along the first side of the display area.

(7) Preferably in the three-dimensional display device described in the paragraph (6) above, the second bus electrode may be connected via a bridge wire to another layer before being connected again to the same layer as the bus electrode lead wires and extending in the second direction along the second side of the display area.

(8) Preferably in the three-dimensional display device described in the paragraph (7) above, the bridge wire may be constituted by indium tin oxide.

BRIEF DESCRIPTION OF THE DRAWINGS

Further objects and advantages of the present invention will become apparent upon a reading of the following description and appended drawings in which.

DESCRIPTION OF THE PREFERRED EMBODIMENTS

The specifics of the present invention are described below using a preferred embodiment.

First Embodiment

Figure 1:
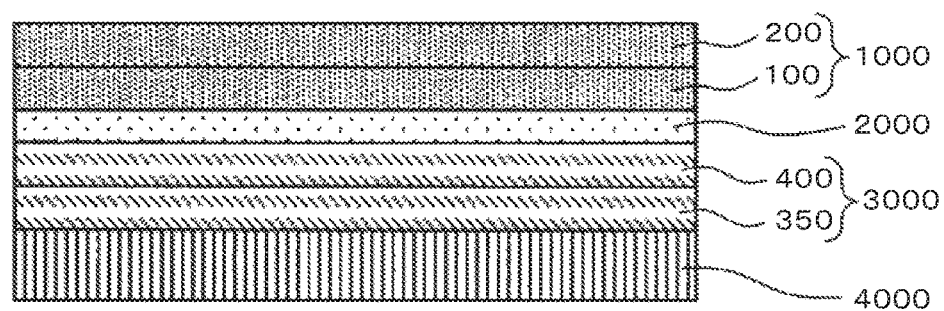
FIG. 1 is a schematic cross-sectional view of a three-dimensional (3D) display device operating by the parallax barrier method according to the present invention.

FIG. 1 is a schematic cross-sectional view of a three-dimensional (3D) display device according to the present invention. The device shown in FIG. 1 is configured to turn images formed by a liquid crystal display panel 3000 into a viewable 3D image using a liquid crystal parallax barrier panel 1000. A transparent adhesive material 2000 bonds the liquid crystal parallax barrier panel (simply the liquid crystal panel or the parallax barrier panel hereunder) 1000 to the liquid crystal display panel 3000.

The liquid crystal display panel 3000 is structured to have a thin-film transistor (TFT) substrate 350 and a counter substrate 400 put together by a sealing material with liquid crystal sealed therebetween, the TFT substrate 350 being formed by pixels with TFTs and pixel electrodes in a matrix pattern. Over the TFT substrate 350, scanning lines extend in a first direction and are arrayed in a second direction. Also over the TFT substrate 350, video signal lines extend in the second direction and are arrayed in the first direction. The portions enclosed by the scanning lines and the video signal lines constitute the pixels. Over the counter substrate 400, a black matrix is generally formed at the portions corresponding to the scanning lines or the video signal lines of the TFT substrate 350 so as to improve the contrast of the screen.

Since liquid crystal does not illuminate itself, a backlight 4000 is disposed behind the liquid crystal panel 3000. In addition to light sources, the backlight 4000 includes optical components such as a light guiding panel and a diffuser and, in some cases, a prism sheet to improve the utilization efficiency of light.

Figure 2:
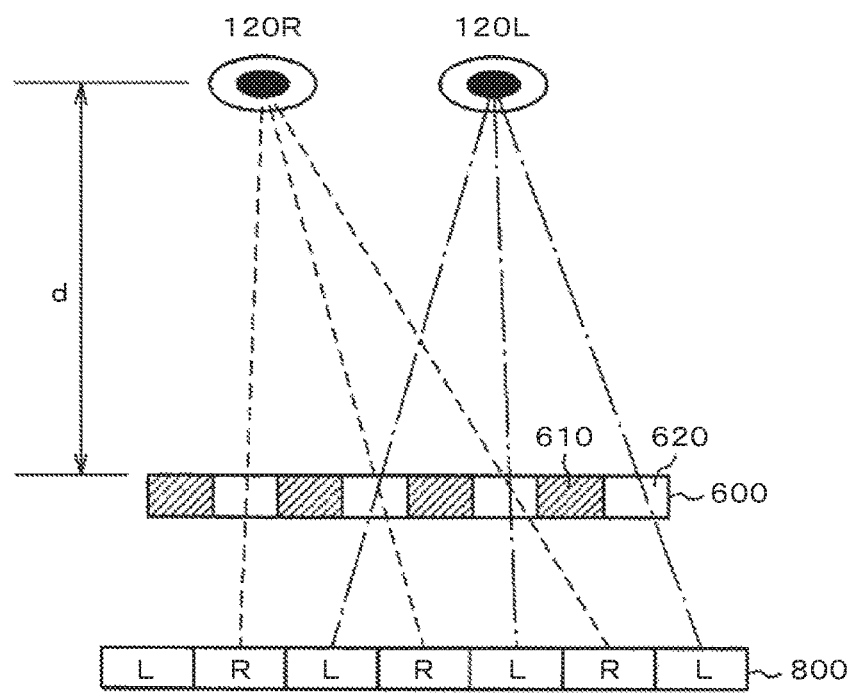
FIG. 2 is a schematic cross-sectional view illustrating the operating principle of the parallax barrier method.

FIG. 2 is a schematic cross-sectional view illustrating the operating principle of the parallax barrier method. A barrier area 610 and an opening area 620 provided in a barrier pattern 600 allow the right and the left eyes of a person to recognize, respectively, a right-eye image R and a left-eye image L that are formed by the display device 800. This enables the person to recognize a 3D image.

Figure 3A:
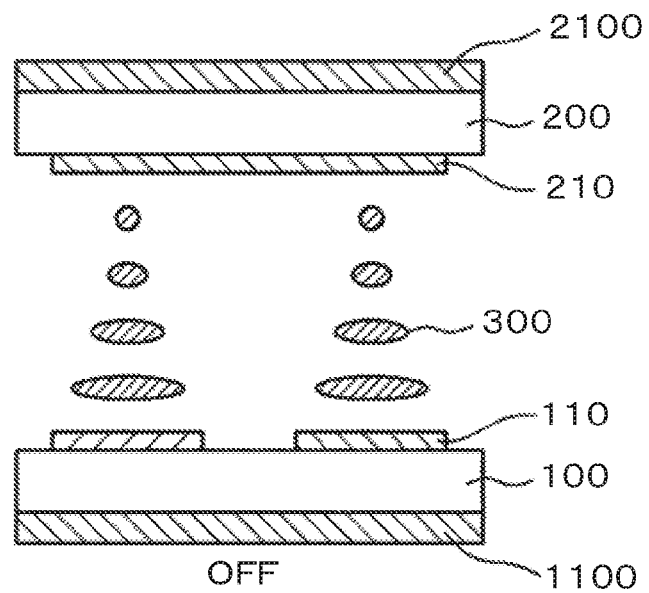
FIGS. 3A and 3B are cross-sectional views showing how a barrier panel operates.
Figure 3B:
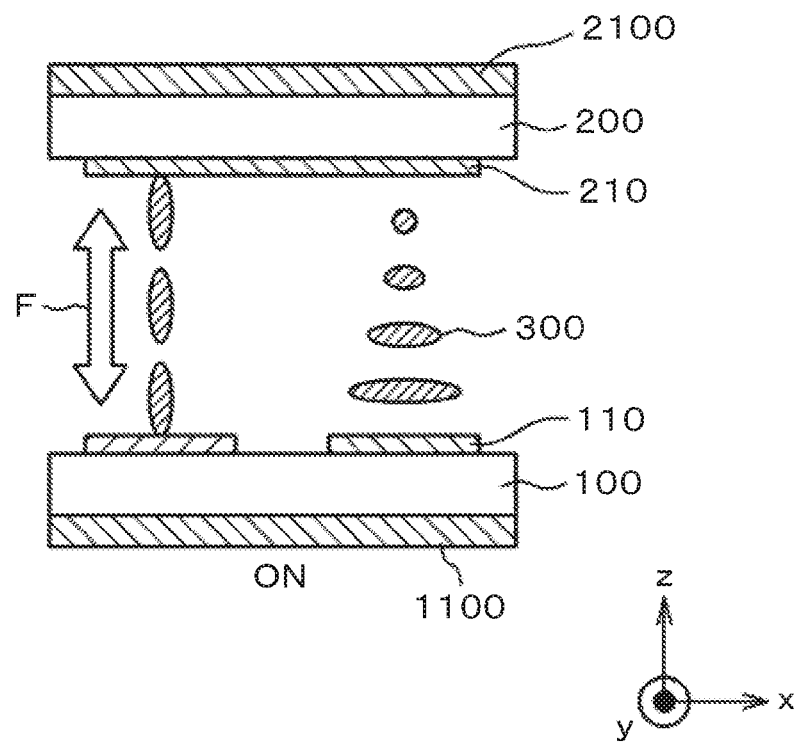

FIGS. 3A and 3B are cross-sectional views showing how a liquid crystal parallax barrier panel operates. Both FIG. 3A and FIG. 3B indicate a twisted nematic (TN) liquid crystal panel. An upper polarizing plate 2100 is attached to the outside of a common substrate 200, and a lower polarizing plate 1100 is attached to the outside of a barrier substrate 100. In FIG. 3A, a common electrode 210 is formed flat over the entire surface of the common substrate 200. Over the barrier substrate 100, stripe-shaped barrier electrodes 110 arrayed at a predetermined pitch extend in a Y coordinate direction. Liquid crystal molecules 300 are twisted by 90 degrees from the barrier substrate 100 toward the common substrate 200. FIG. 3A shows a state in which no voltage is impressed between the common electrode 210 and the barrier electrodes 110, so that the light from the liquid crystal panel is not modulated. In this state, a two-dimensional (2D) image is thus displayed.

FIG. 3B shows a state in which a voltage is impressed to every other barrier electrode 110 of the same parallax barrier panel. An area whose barrier electrode 110 is impressed with the voltage blocks light, and an area whose barrier electrode 110 is not impressed with the voltage allows light to pass through. When viewed from the principal surface of the parallax barrier panel, stripe-shaped light-blocking areas and stripe-shaped light-transmitting areas are seen formed alternately. In FIG. 3B, arrow F indicates an electrical field.

As shown in FIG. 2, the parallax barrier method requires fixing the human eyes and the parallax barrier panel in predetermined positions in order to present a complete 3D image. If the human eyes shift crosswise, the pixels supposed to be recognized only by the left eye also come to be recognized by the right eye, and the pixels supposed to be recognized solely by the right eye are also recognized by the left eye. This phenomenon is called crosstalk, which degrades the quality of 3D images.

Figure 4:
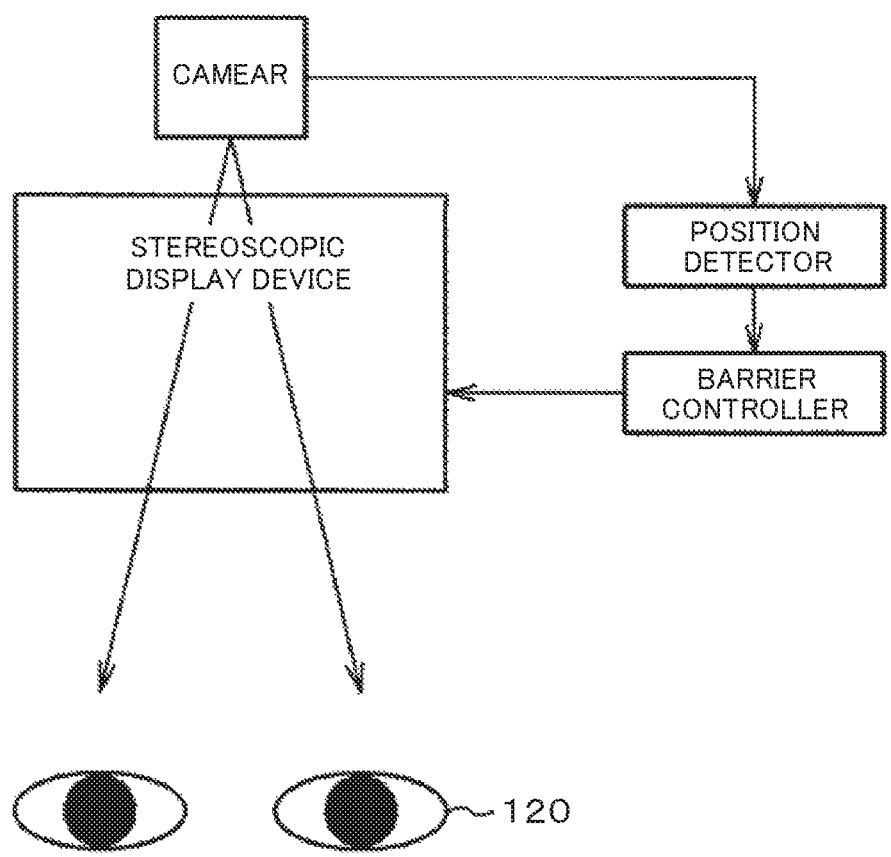
FIG. 4 is a block diagram of an eye tracking system.

This phenomenon is prevented by a method of moving the barrier position in keeping with the human eye positions. FIG. 4 is a block diagram showing a system that tracks human eye movements using a camera and feeds back the movement data to a display device. This system will be called the eye tracking system hereunder. In FIG. 4, a camera measures the positions of the human eyes 120. The camera may be a photographic camera attached to mobile terminals, for example. This system can operate without resorting to a dedicated camera.

In FIG. 4, the positions of the human eyes 120 detected by the camera are input to a position detector that inputs its signal to a barrier controller. The barrier controller in turn generates a signal to control the position of a barrier pattern over the barrier substrate. This signal is input to a stereoscopic display device (3D display device) that has a parallax barrier panel.

Figure 5A:
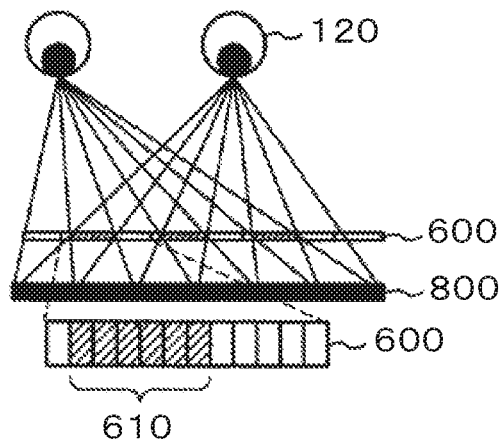
FIGS. 5A, 5B and 5C are cross-sectional views showing how parallax characteristics are improved by having a barrier area formed with a plurality of barrier electrodes.
Figure 5B:
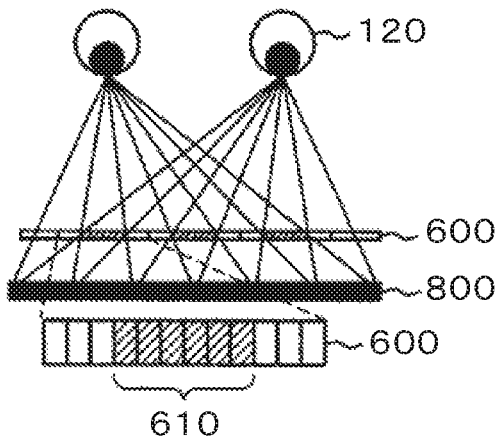
Figure 5C:
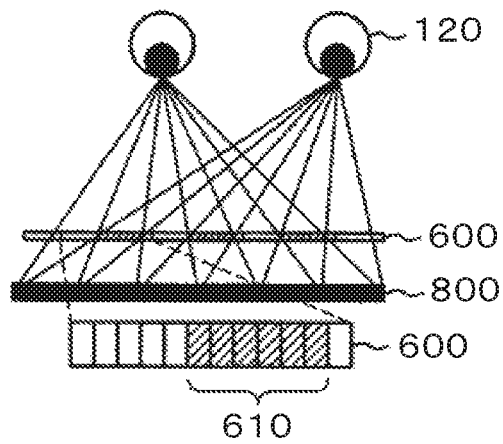

FIGS. 5A, 5B and 5C schematically show how a barrier pattern 600 is moved in keeping with the movements of the human eyes 120 so that the pixels for the right eye and those for the left eye will not produce crosstalk when the human eyes 120 shift. In FIGS. 5A to 5C, the person can recognize a 3D image when his or her eyes 120 view a pixel pattern 800 through the barrier pattern 600. From FIG. 5A to FIG. 5B to FIG. 5C, the human eyes 120 gradually shift from left to right as viewed in the figures. Shown at the bottom of each of FIGS. 5A to 5C is a rectangle-arrayed pattern indicating that the barrier area 610 shifts from left to right in keeping with human eye movements in a single barrier shifting zone of the barrier pattern 600. This prevents the crosstalk incurred between the right eye-oriented pixels and the left eye-oriented pixels.

Figure 6:
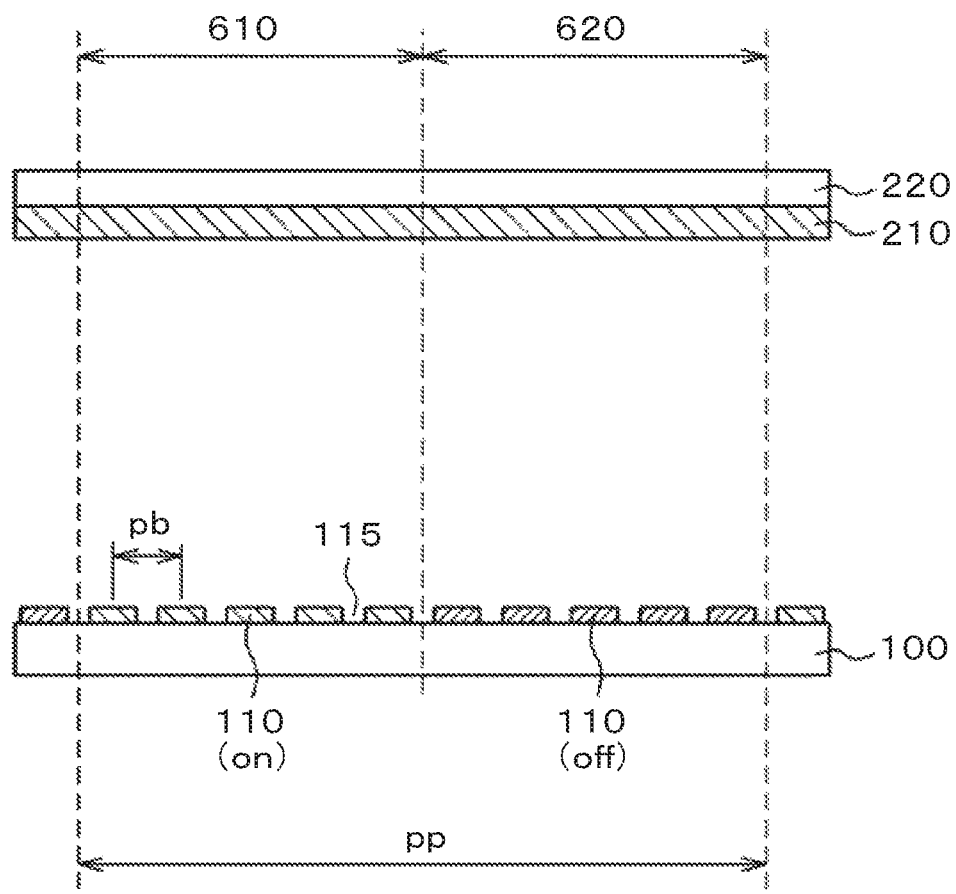
FIG. 6 is a schematic view showing an example of forming the barrier area using a plurality of barrier electrodes.

FIG. 6 shows an electrode structure for moving the barrier pattern 600 over the parallax barrier panel. In FIG. 6, as in conventional setups, the common electrode 210 is formed flat over the common substrate 200. Meanwhile, the barrier electrodes 110 over the barrier substrate 100 extend in stripes in the depth direction of the figure. A barrier electrode pitch pb, it should be noted, is one-tenth (1/10) of one barrier shifting zone of the barrier pattern. Whereas the setup in FIG. 6 supports a 10-level parallax, the barrier electrodes may alternatively be formed at a smaller pitch. In FIG. 6, 5 barrier electrodes 110 are turned on to form the barrier area 610, with 5 barrier electrodes 110 turned off to form the opening area 620. The number of barrier electrodes to be turned on is not limited to 5. To shift the position of the barrier area 610, the barrier electrodes 110 on either side of the barrier area 610 need only be turned off, with the barrier electrodes 110 on the other side of the barrier area 610 turned on.

When the barrier area 610 is formed by a plurality of barrier electrodes 110 in the manner described above, the position of the barrier area 610 can be shifted to ensure precise feedback through eye tracking. In FIG. 6, the barrier area 610 is formed where the barrier electrodes 110 are turned on, and the opening area 620 is formed where the barrier electrodes 110 are turned off. That the barrier electrodes 110 are turned on means that they are impressed with a voltage.

Figure 7:
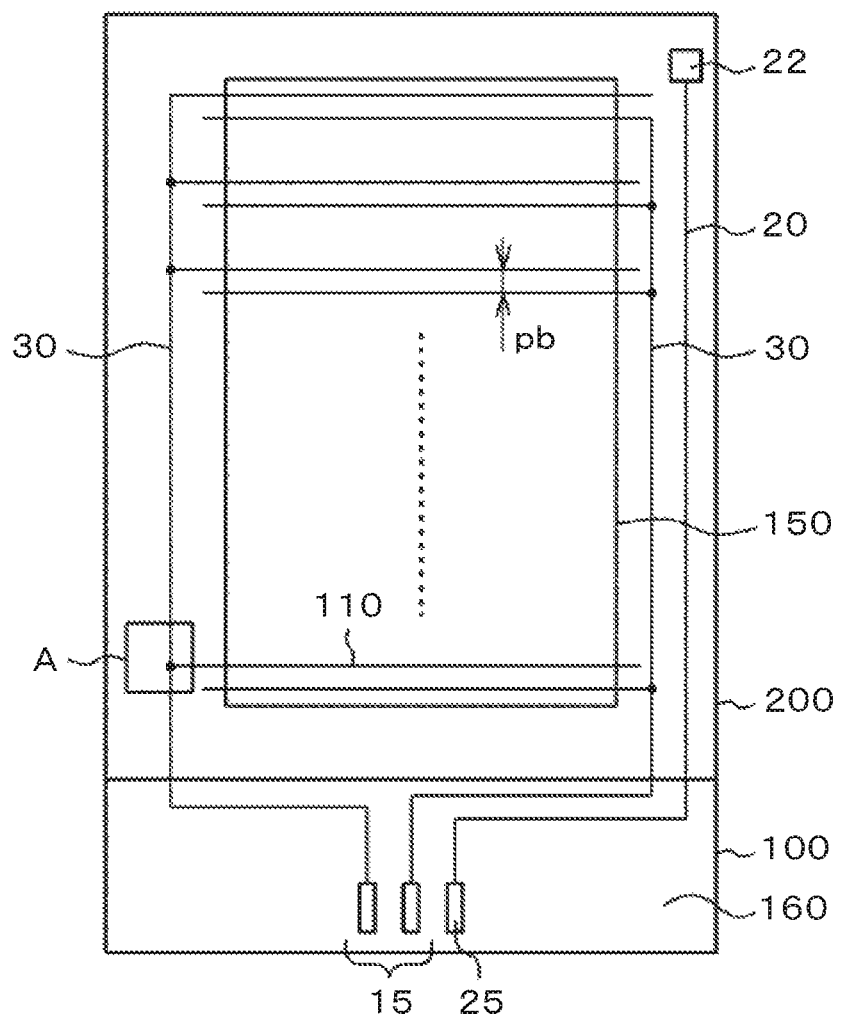
FIG. 7 is a plan view of a parallax barrier panel having barrier electrodes with single-layer wiring to improve parallax characteristics.

FIG. 7 is a plan view of a state in which the pitch pb of the barrier electrodes 110 is half (1/2) the pitch pp of the barrier pattern over the parallax barrier panel in FIG. 6. That is, the parallax barrier panel in FIG. 7 supports the eye tracking system for a 2-level parallax. In FIG. 7, the common substrate 200 is disposed on the barrier substrate 100, with liquid crystal sandwiched therebetween. The barrier substrate 100 is formed larger than the common substrate 200. That portion of the barrier substrate 100 which is not overlaid with the common substrate 200 constitutes a terminal area 160. Two barrier electrode terminals 15 and one common electrode terminal 25 are disposed in the terminal area 160. The common terminal 25 is connected, via a common wire 20 and a common wire connecting part 22, to the common electrode 210 formed on the common substrate 200. One of the two barrier electrode terminals 15 is connected to a bus electrode 30 extending in a longitudinal direction on the left side of the display area 150. The other barrier electrode terminal 15 is connected to a bus electrode 30 extending also in the longitudinal direction on the right side of the display area 150. In FIG. 7, the barrier electrodes 110 extend alternately from the left-side and the right-side bus electrodes 30, in a crosswise direction over the display area 150. In the display area 150, the barrier electrodes are arrayed at the pitch pb in the longitudinal direction. The barrier substrate 100 has a first side and a second side along which the bus electrodes 30 are disposed. In FIG. 7, the common wire 20 is disposed along the second side. The barrier electrode terminals 15 are disposed along a third side.

In the parallax barrier panel in FIG. 7, if any barrier electrode 110 breaks halfway, the portion downstream of the broken part does not provide the barrier function. This renders the parallax barrier panel defective. To eliminate this problem, the present invention proposes forming the bus electrodes 30 on both sides of the display area 150 so that the barrier electrodes 110 are supplied with a bus voltage from the bus electrodes 30 on both sides, as will be discussed later. However, this kind of wiring can involve numerous terminals if implemented in a single-layer structure. To minimize the growing number of terminals requires forming a two-layer wiring structure near the terminals.

The parallax barrier panel in FIG. 7 supports only the 2-level parallax. The wiring structure in FIG. 7 is not sufficient to support the parallax of 3 levels or more. The connections between the barrier electrodes 110 and the bus electrodes 30 need to be implemented also in a multilayer wiring structure. Because the ITO constituting the barrier electrodes 110 is not completely transparent but has a predetermined transmission factor, a light pattern and a dark pattern are repeated in an ITO pattern. This leads to the generation of moire in 2D image display.

If the barrier area 610 is structured with many more barrier electrodes 110 as shown in FIG. 6, finer parallax adjustment can be supported in eye tracking. However, the structure in FIG. 6 involves slits 115 that cause light to pass through between the barrier electrodes 110, so that a light pattern and a dark pattern are repeated even in the barrier area. This results in the generation of moire in 3D image display. Furthermore, because the ITO constituting the barrier electrodes 110 is not completely transparent but has a predetermined transmission factor, a light pattern and a dark pattern are repeated in the ITO pattern. This leads to the generation of moire in 2D image display.

Figure 8:
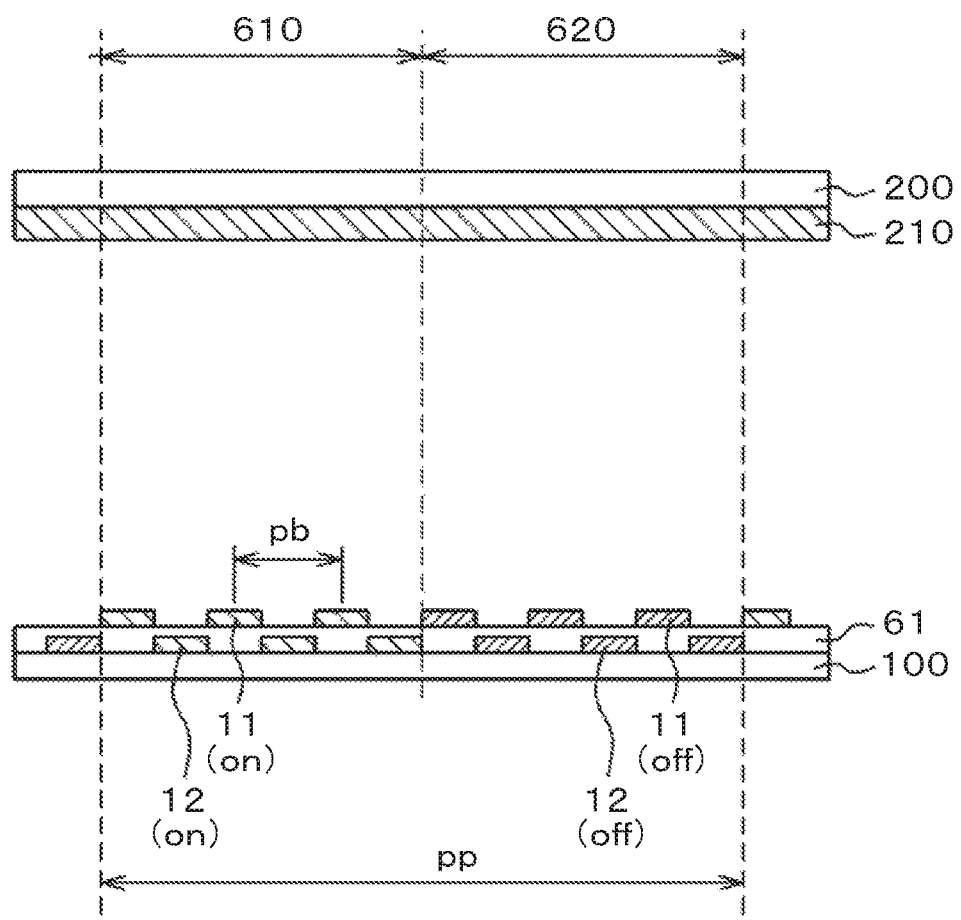
FIG. 8 is a cross-sectional view of a parallax barrier panel having two-layer barrier electrodes.

FIG. 8 is a cross-sectional view of a parallax barrier panel that solves the above problem. What makes the structure of FIG. 8 different from that of FIG. 6 is that the barrier electrodes 110 are formed by upper layer barrier electrodes 11 and lower layer barrier electrodes 12 on the side of the barrier substrate 100. A first interlayer insulating film 61 is interposed between the upper layer barrier electrodes 11 and the lower layer barrier electrodes 12. In FIG. 8, one upper layer barrier electrode 11 and a lower layer barrier electrode 12 seen adjacent to that electrode 11 in a plan view are impressed with the same voltage. The two electrodes are paired to constitute a barrier electrode couple. Because the lower layer barrier electrodes 12 are found between the upper layer barrier electrodes 11 when viewed in a plan view, there is no slit-pattern opening area between the upper layer barrier electrodes 11. This prevents the generation of moire.

In FIG. 8, the width of each lower layer barrier electrode 12 may be the same as the gap between two upper layer barrier electrodes 11. However, considering the accuracy of alignment between the barrier substrate 100 and the common substrate 200, the width of each lower layer barrier electrode 12 may preferably be slightly wider than the gap between two upper layer barrier electrodes 11.

Although FIG. 8 shows that each upper layer barrier electrode 11 has the same width as each lower layer barrier electrode 12, the two types of electrodes may be formed to have different widths. Specifically, each upper layer barrier electrode 11 may be formed to be wider than each lower layer barrier electrode 12, or vice versa. FIG. 8 shows a state in which the pitch pb of the upper layer barrier electrodes 11 is one-sixth (⅙) of the pitch pp of the barrier pattern. That is, the structure in FIG. 8 supports a 6-level parallax.

Figure 9:
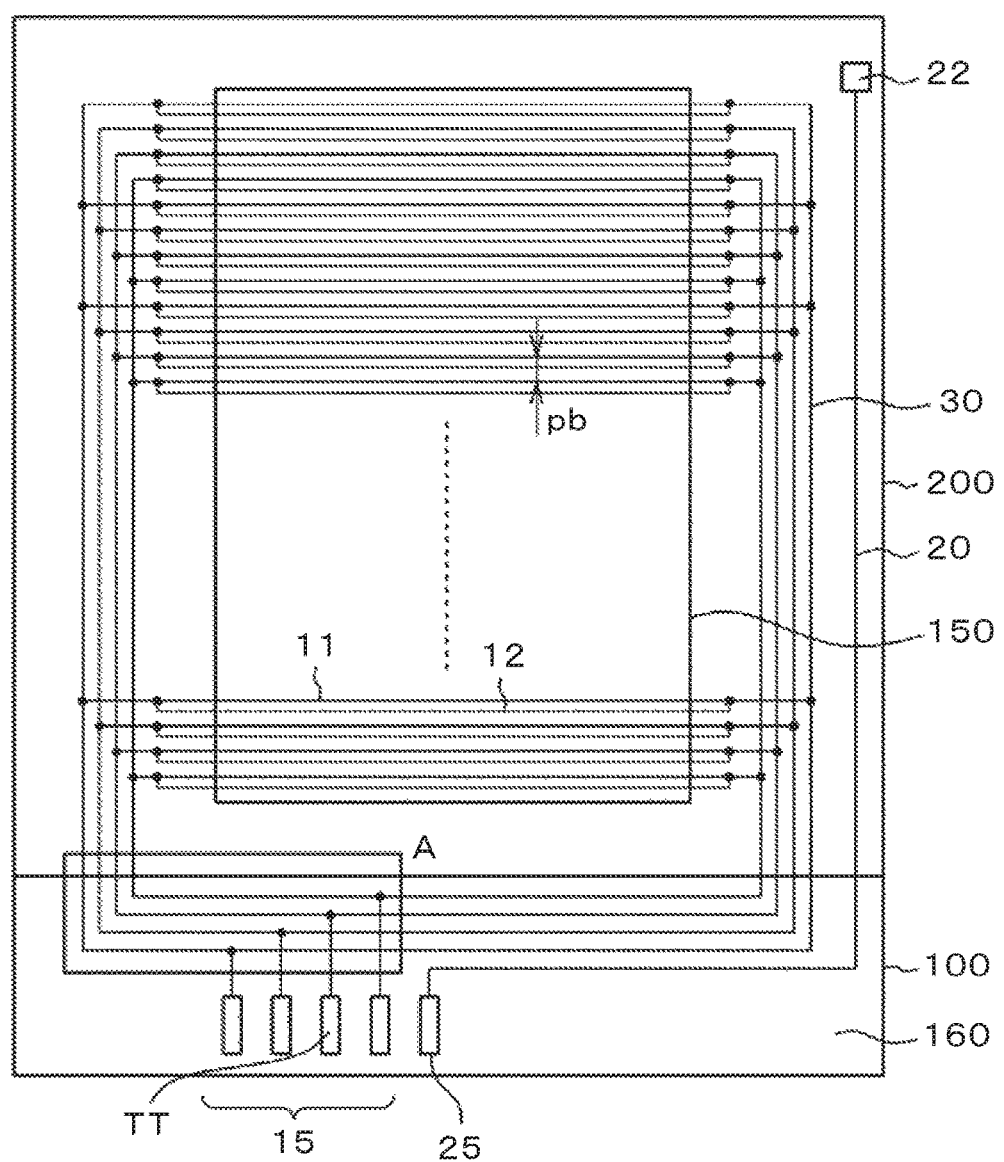
FIG. 9 is a plan view of a parallax barrier panel according to the present invention.

FIG. 9 is a plan view of a parallax barrier panel according to the present invention. In FIG. 9, the same barrier electrodes 11 are supplied with a barrier potential from the bus electrodes 30 formed on both sides. Thus if any barrier electrode 11 breaks, the problem is limited to the broken part alone and has little effect on 3D image display. Although the barrier electrodes 11 over the display area are constituted by ITO and thus have higher resistance than metal wiring, having these electrodes powered from both sides minimizes response delay. Incidentally, the first and second barrier electrodes are constituted by ITO to form transparent electrodes, while the bus electrodes are constituted by an alloy such as a molybdenum-chromium (MoCr) alloy or by a suitable metal.

Over the display area in the plan view of FIG. 9, the pitch pb of the upper layer barrier electrodes 11 is one-fourth (¼) of the pitch pp of the barrier pattern according to the system in FIG. 8. That is, the structure in FIG. 9 supports a 4-level parallax. In FIG. 9, 4 barrier electrode terminals 15 are disposed to support the 4-level parallax. In FIG. 9, whereas the barrier electrodes are powered from the barrier electrode terminals on both side, an area indicated by A in the figure is formed to be a multilayer wiring structure that limits the number of barrier electrode terminals 15 to 4.

Figure 10:
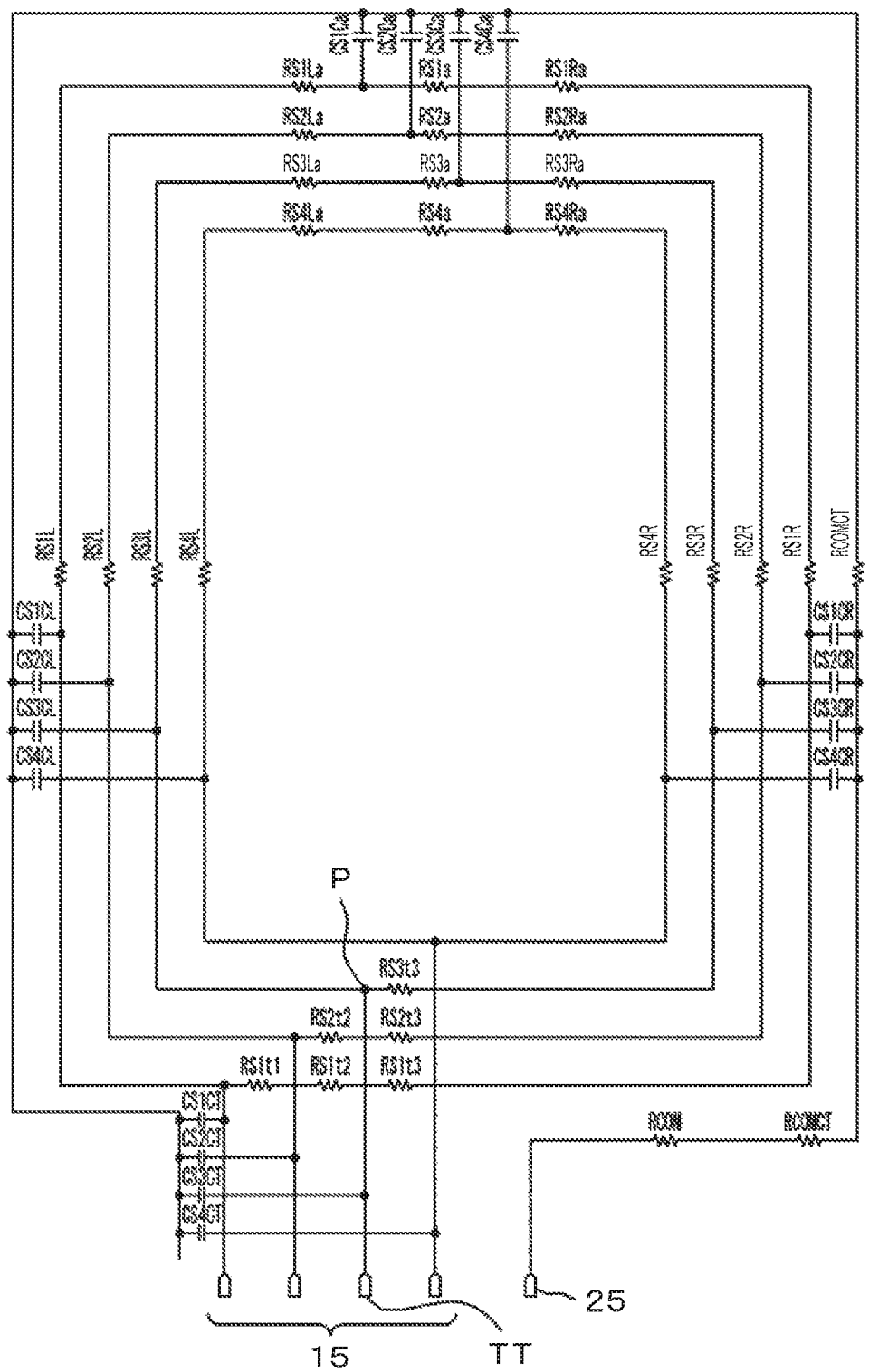
FIG. 10 is a diagram showing an equivalent circuit of the parallax barrier panel in FIG. 9.

FIG. 10 is a diagram showing an equivalent circuit corresponding to the circuit in FIG. 9. Table 1 below lists specific resistors and capacitors used in the equivalent circuit of FIG. 10. What characterizes the circuit in FIG. 10 is that although the barrier electrodes 11 and 12 are supplied with the barrier signal from the bus electrodes 30 on both sides, an ITO-constituted bridge wire structure is provided in an area corresponding to the area A in FIG. 9 so that the number of terminals is reduced.

TABLE 1

| | |
|---|---|
| RS1La-RS4La | Resistors between left-side bus electrodes and barrier electrodes |
| RS1Ra-RS4Ra | Resistors between right-side bus electrodes and barrier electrodes |
| CS1Ca-CS4Ca | Capacitors between barrier electrodes and common electrode (inside display area) |
| RS1L-RS4L | Left-side bus electrode resistors |
| RS1R-RS4R | Right-side bus electrode resistors |
| CS1CL-CS4CL | Capacitors between left-side bus electrodes and common electrode |
| CS1CR-CS4CR | Capacitors between right-side bus electrodes and common electrode |
| RS1t1-RS1t4 | ITO-constituted bridge resistors |
| RS2t2-RS2t4 | ITO-constituted bridge resistors |
| RS3t3-RS3t4 | ITO-constituted bridge resistors |
| RCOM | Common bus line resistor on barrier substrate |
| RCOMCT | Connection resistor between barrier substrate and common substrate |
| CS1Ct-CS4Ct | Capacitors between bus electrode lead wires on one hand and common bus line and common electrode on the other hand |

Figure 11:
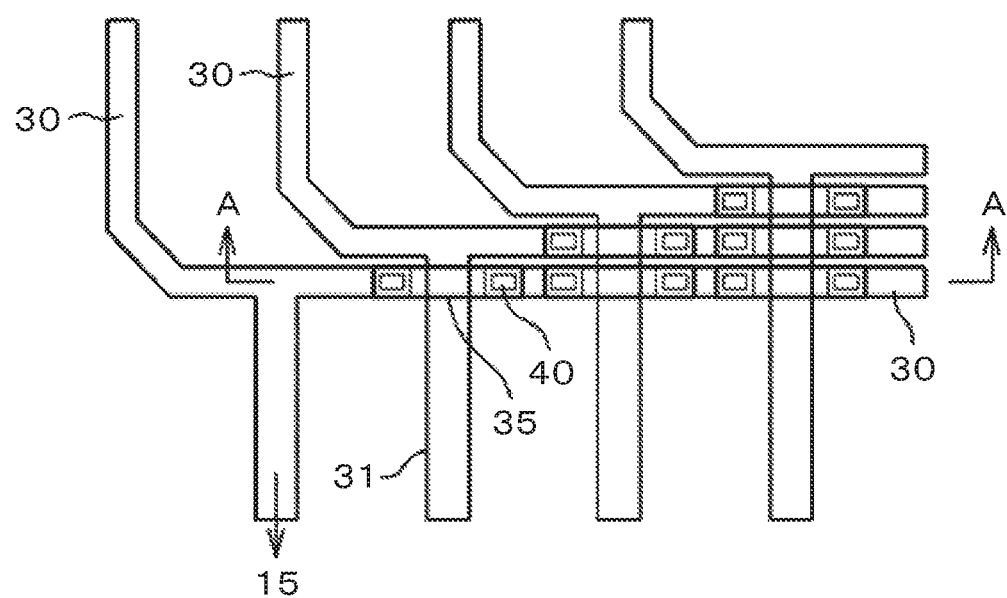
FIG. 11 is a plan view showing details of an area A in FIG. 9.
Figure 12:
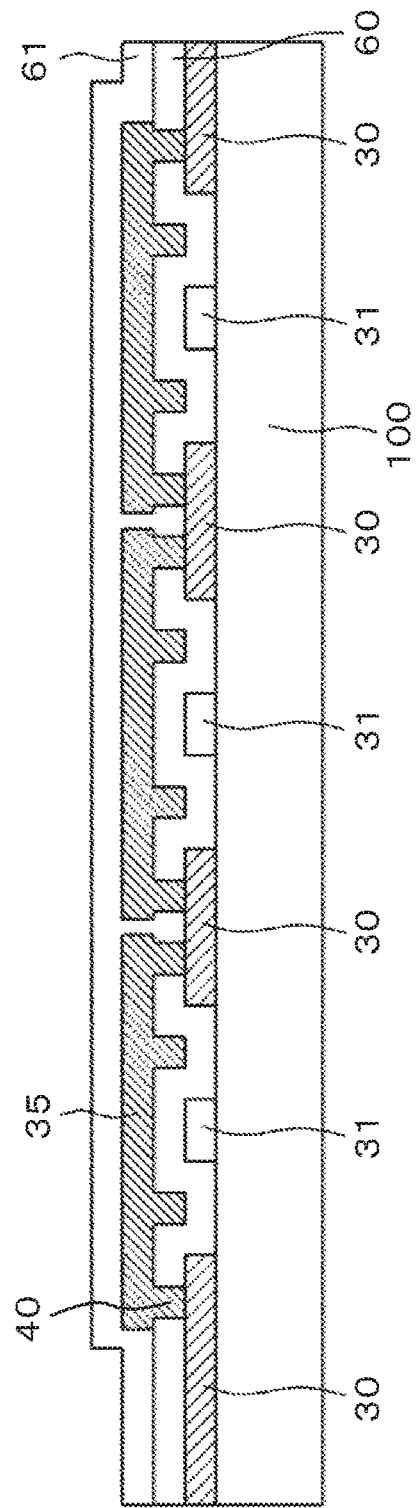
FIG. 12 is a cross-sectional view taken on line A-A in FIG. 11.

FIG. 11 is a plan view corresponding to the area A in FIG. 9. In FIG. 11, ITO-constituted bridge wires 35 are formed in a manner spanning the bus electrode lead wires 31. FIG. 12 is a cross-sectional view taken on line A-A in FIG. 11. In FIG. 12, the bus electrodes 30 and the bus electrode lead wires 31 connecting the bus electrodes 30 to their terminals are formed over the substrate 100. An interlayer insulating film 60 covers the bus electrodes 30 and the bus electrode lead wires 31. Formed over the interlayer insulating film 60 are the ITO-constituted bridge wires 35 which in turn are covered by a protective film 61. The bus electrodes 30 are interconnected with one another by the bridge wires 35 via through holes 40 formed in the interlayer insulating film 60. The interlayer insulating film 60 or the protective film 61 is constituted by silicon nitride (SiN), for example.

Figure 13:
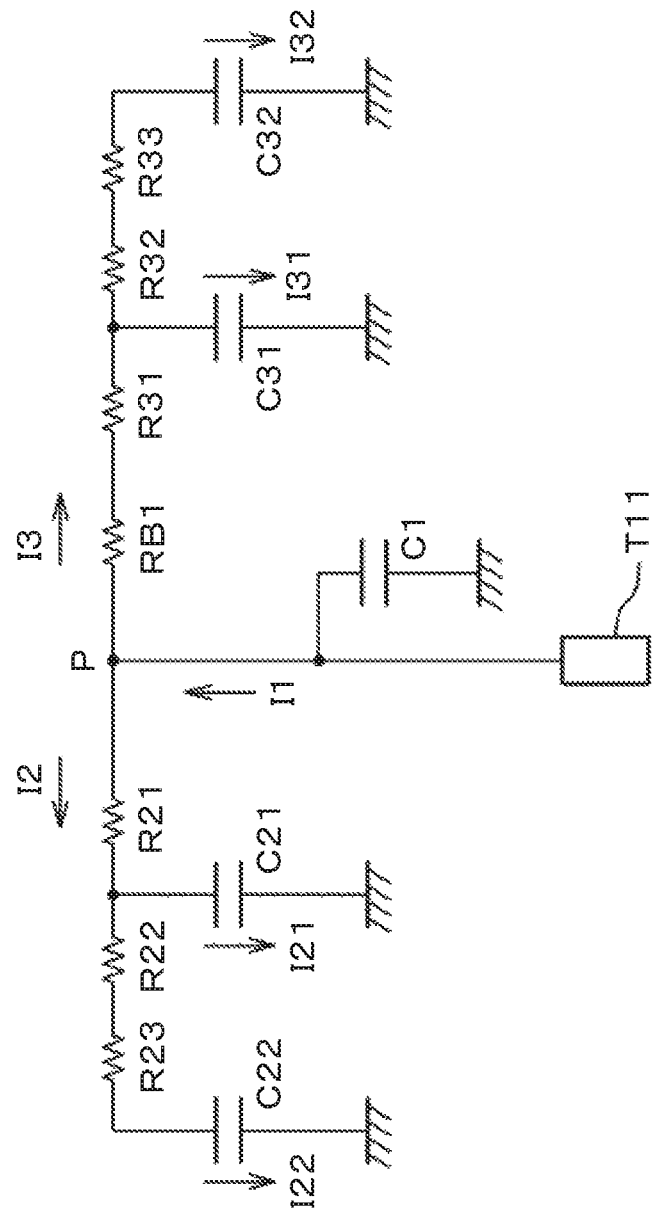
FIG. 13 is a diagram showing an equivalent circuit in effect when a static electrical charge has entered a terminal in the configuration of FIG. 9.

FIG. 13 is a diagram showing an equivalent circuit in effect when a static electrical charge has entered a terminal TT in the configuration of FIG. 9 or 10. In FIG. 13, a capacitor C1 is the capacitor between the bus electrode lead wire and the common electrode, and corresponds to a capacitor CS3Ct in FIG. 10. A resistor R21 in the left-side circuit in FIG. 13 is a bus electrode resistor corresponding to a resistor RS3L in FIG. 10. A capacitor C21 corresponds to a capacitor CS3CL between the common electrode and the bus electrode; a resistor R22 corresponds to a connection resistor RS3LA between the bus electrode and the barrier electrode; a resistor R23 corresponds to a barrier electrode resistor RS3*a*; and a capacitor C22 corresponds to a capacitor CS3Ca between the barrier electrode and the common electrode.

A resistor RB1 in the right-side circuit in FIG. 13 corresponds to a bridge wire resistor RS3*t*3 in FIG. 10. A bus electrode resistor R31 corresponds to a resistor RS3R in FIG. 10; a capacitor C31 corresponds to a capacitor CS3CR between the common electrode and the bus electrode; a resistor R32 corresponds to a connection resistor RS3Ra between the bus electrode and the barrier electrode; a resistor R33 corresponds to a barrier electrode resistor RS3*a*; and a capacitor C32 corresponds to a capacitor CS3Ca between the barrier electrode and the common electrode. Resistors R23 and R33 are identical. Capacitors C22 and C32 are approximately the same in size. What characterizes the equivalent circuit in FIG. 13 is that there is no bridge wire resistor RB1 in the left-side circuit.

Suppose that in FIG. 13, a static electrical charge enters a terminal T11. Since the capacitor C1 in FIG. 13 is very small, the static electricity at a branch point P is hardly attenuated in voltage and immediately turns into a static electricity voltage Vp. From the branch point P, a current I2 flows to the left and a current I3 flows to the right. In the setup of FIG. 13, the left-side circuit has no wire resistor RB1 and has that much less resistance than the right-side circuit. It follows that the current I2 is greater than the current I3 (I2>I3). However, with the bus electrode resistors R21 spread over a wide area, the bus electrodes do not melt even when the large current I2 flows and the power caused by static electricity is consumed by the bus electrodes.

Meanwhile, the bridge resistor RB1 in the right-side circuit in FIG. 13 is constituted by ITO and thus has high resistance. Moreover, the resistors RB1 are formed over a very small area. That means some resistors RB1 can melt upon consuming large power. In FIG. 13, however, the current I2 is larger than the current I3, so that the power consumed by the bridge resistors RB1 is small and thus these resistors will not melt.

In FIG. 13, the barrier electrodes are constituted by ITO, and the wires connecting the bus electrodes to the barrier electrodes may also be constituted by ITO. The current flowing through the resistance involved is thereby reduced (I2−I21) and is further lowered by the capacitors C21 spread throughout the barrier electrodes. Thus static electricity will not melt the barrier electrodes.

Figure 14:
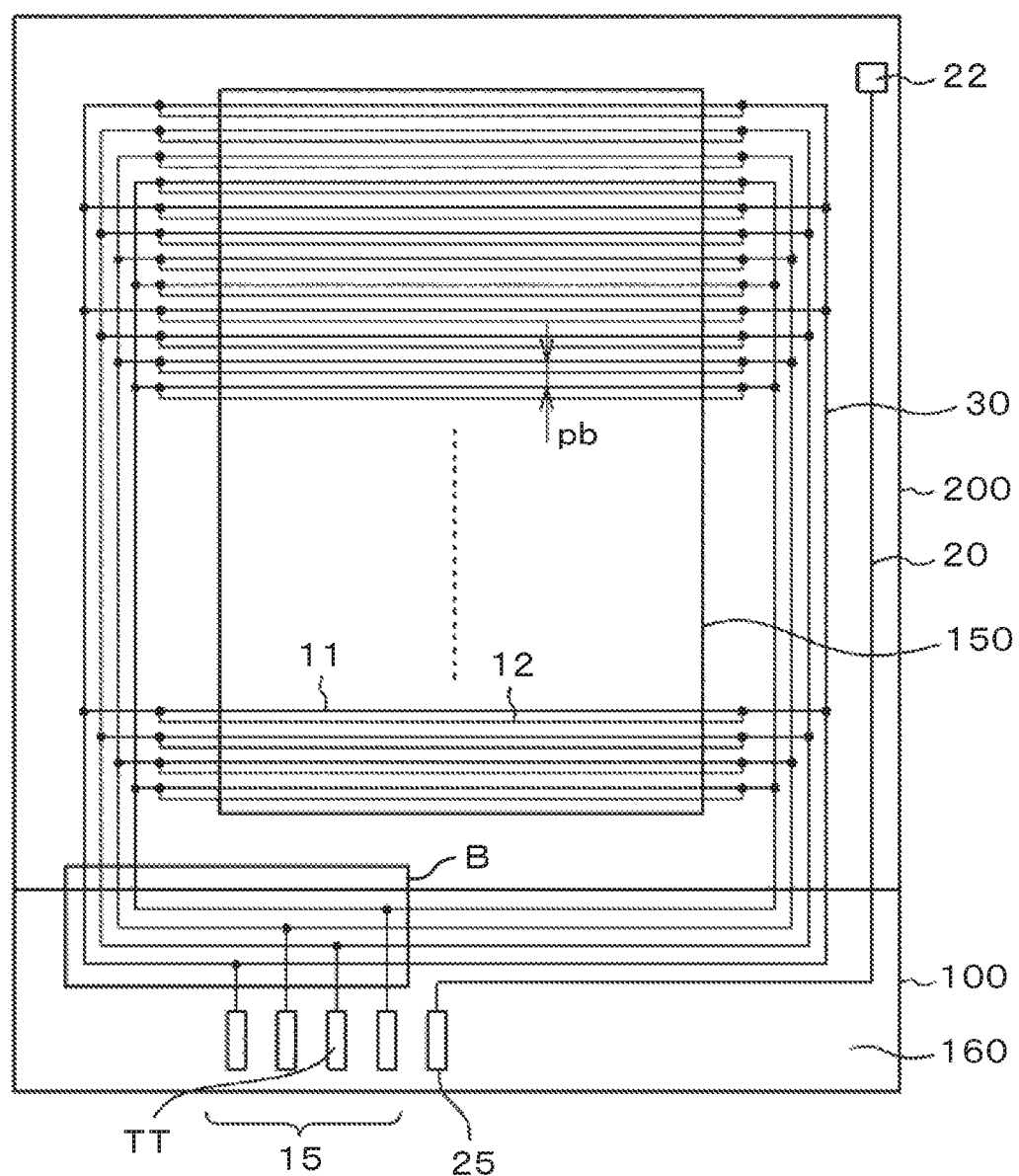
FIG. 14 is a plan view of a parallax barrier panel in effect when the circuit configuration shown in FIG. 11 is not used.

FIG. 14 shows an example in which the configuration of FIG. 9 is not used. What makes the configuration of FIG. 14 different from that of FIG. 9 is the manner in which the bus electrode lead wires 31 are connected in an area B. In FIG. 14, the way the terminal TT and the terminal on the left are connected differs from what is shown in FIG. 9. The bus electrode lead wire 31 connected to the terminal TT has the bridge wires 35 formed on both sides of the branch point. The other details are the same as those in FIG. 9.

Figure 15:
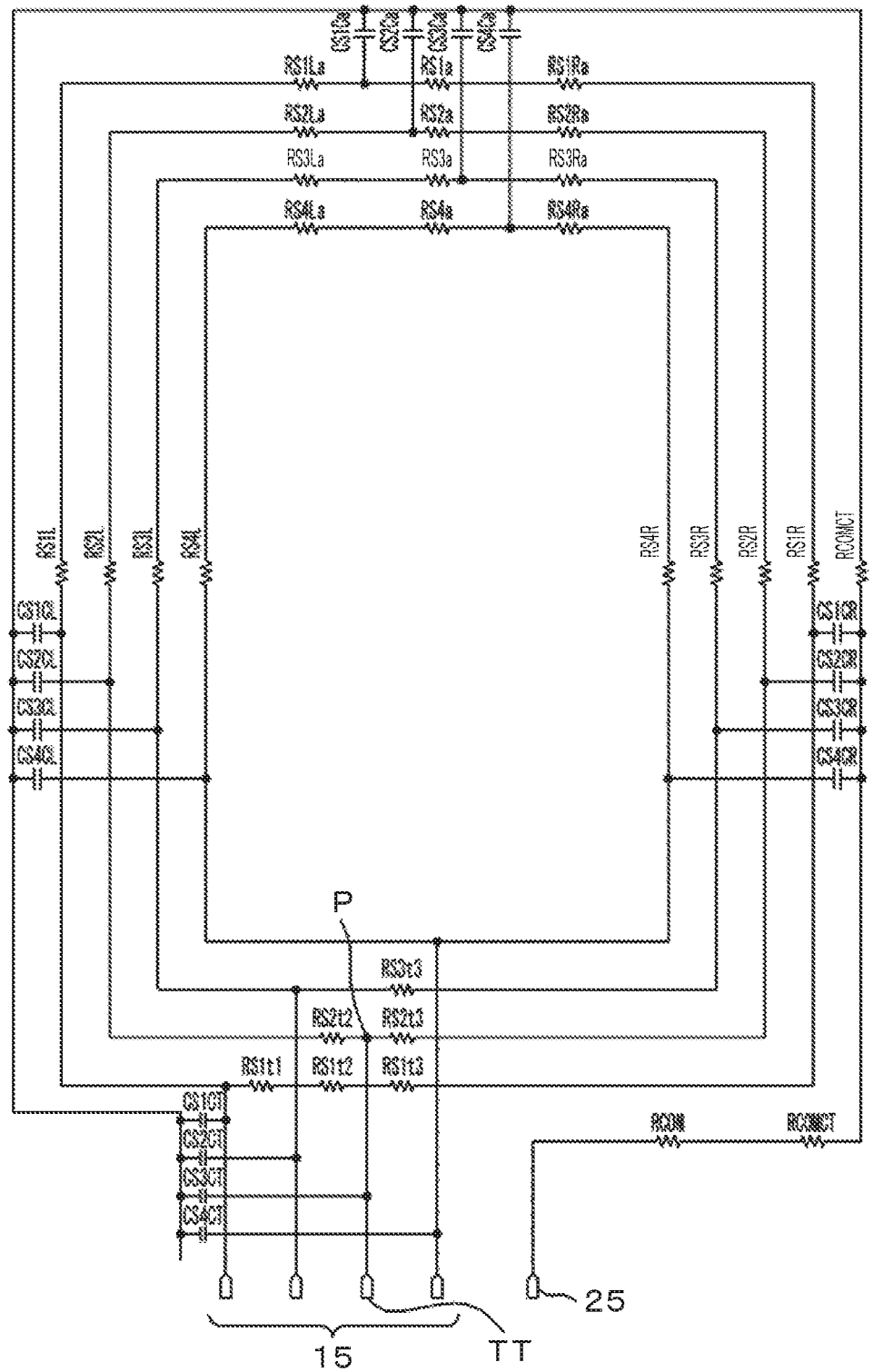
FIG. 15 is a diagram showing an equivalent circuit of the parallax barrier panel in FIG. 14.

FIG. 15 is a diagram showing an equivalent circuit corresponding to the circuit in FIG. 14. What makes the equivalent circuit of FIG. 15 different from that of FIG. 10 is the manner in which the terminal TT and the terminal on the left are connected. The other wires are the same as those in FIG. 10. In FIG. 15, bridge wire resistors are provided on both sides of the branch point P on the bus electrode lead wire 31 connected to the terminal TT. Specifically, a resistor RS2*t*2 is provided in the left-side circuit and a resistor RS2*t*3 is provided in the right-side circuit.

Figure 16:
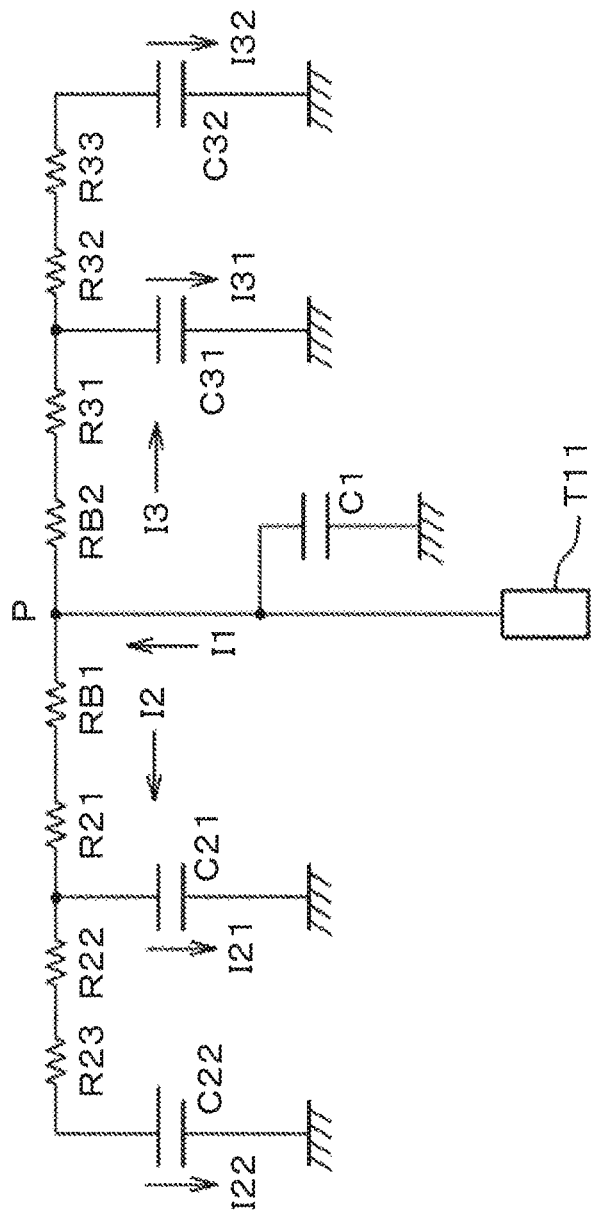
FIG. 16 is a diagram showing an equivalent circuit in effect when a static electrical charge has entered a terminal in the configuration shown in FIG. 14.

FIG. 16 is a diagram showing an equivalent circuit in effect when a static electrical charge has entered the terminal TT in the configuration in FIG. 14. What makes the equivalent circuit of FIG. 16 different from that of FIG. 13 is that the bridge wire resistor RB1 is provided in the circuit on the left of the branch point P leading from the terminal TT, with the bridge wire resistor RB2 provided in the right-side circuit. That is, in FIG. 16, the right-side and the left-side circuits are symmetrical across the branch point P.

Suppose now that a static electrical charge has entered the terminal T11 in FIG. 16. In FIG. 16, the capacitor C1 is so small that the static electricity at the branch point P is hardly attenuated in voltage and immediately turns into a static electricity voltage Vp, as in the case of FIG. 13. From the branch point P, a current I2 flows to the left and a current I3 flows to the right. Since the left-side and the right-side circuits in FIG. 16 are symmetrical, the current I2 is equal to the current I3 (I2=I3). That is, if the static electricity voltage Vp is high, the currents I2 and I3 can become large currents.

In the left-side circuit in FIG. 16, the resistor RB1 is an ITO-constituted bridge wire resistor that has relatively high resistance but is very small in area. In this case, the power caused by static electricity is consumed over a very small area, which can cause the bridge wire to melt. The same also applies to the resistor RB2 on the bridge wire in the right-side circuit in FIG. 16.

Each of the circuits shown in FIGS. 9 to 13 are one in which the wires across each terminal are arranged to be asymmetrical so that the magnitudes of currents stemming from static electricity become asymmetrical. The power consumed by the bridge wires is thus reduced so that they will not be broken by static electricity. That is, the circuits shown in FIGS. 9 to 13 provide higher resistance to static electricity than the circuits in FIGS. 14 to 16.

The foregoing description has focused on the terminal TT. The same applies to the other barrier electrode terminals as well. That is, the circuit configuration in FIG. 13, in which one of the two circuits has no bridge wire used on the bus electrode, should preferably be supported by the bus electrodes connected to all terminals.

Whereas the foregoing description has also dealt with the case where the 4-level barrier parallax is in effect, the present invention can also be adapted to a 2-level or 3-level parallax, or to a parallax for 5 levels for more.

Furthermore, the foregoing description has dealt with the case where a first barrier electrode is paired with a second barrier electrode to form a barrier electrode couple. Alternatively, the present invention can also be adapted to the case where only the first barrier electrodes form the barrier electrodes, as shown in FIG. 6.

What is claimed is:
1. A liquid crystal panel comprising a first substrate, a second substrate, liquid crystal sandwiched between the first substrate and the second substrate, wherein:
   a second substrate has a first side, a second side opposite to the first side, and a third side comprising a terminal,
   the second substrate has barrier electrodes extending in a first direction and arrayed in a second direction,
   a first bus line extending in the second direction along the first side, and a second bus line extending in the second direction along the second side,
   a bus lead wire connected to the terminal and extending in the second direction,
   the barrier electrodes are connected to the first bus line and the second bus line,
   the first bus line and the second bus line are electrically connected to each other, the bus lead wire is connected to the first bus line and the second bus line via a branch point, the first bus line is in the same layer as the bus lead wire at the branch point and extending along the first side in the second direction, and the second bus line and the bus lead wire are connected to each other via a bridge that is provided between the branch point and the second bus line and that is in a different layer than the second bus line.

2. The liquid crystal panel according to claim 1, wherein the bridge is indium tin oxide.

3. A three-dimensional display device comprising a display panel and a parallax barrier panel, wherein the parallax barrier panel has a first substrate and a second substrate that has a first side, a second side opposite to the first side, and a third side comprising terminal, the first substrate and the second substrate having liquid crystal sandwiched therebetween, wherein the second substrate has barrier electrodes extending in a first direction and arrayed in a second direction, has a first bus electrode extending in the second direction between the barrier electrodes and the first side, and has a second bus electrode extending in the second direction between the barrier electrodes and the second side, and has a bus electrode lead wire connected to the terminal and extending in the first direction, and wherein the barrier electrodes are connected to the first bus electrode and to the second bus electrode, the first bus electrode and the second bus electrode are electrically connected to each other, the bus electrode lead wire is connected to the first bus electrode and the second bus electrode via a branch point, the first bus electrode is in the same layer as the bus electrode lead wire at the branch point and extending along the first side in the second direction, and the second bus electrode and the bus electrode lead wire are connected to each other via a bridge wire that is provided between the branch point and the second bus electrode and that is in a different layer than the second bus electrode.

4. The three-dimensional display device according to claim 3, wherein the bridge wire is indium tin oxide.

5. A three-dimensional display device comprising a liquid crystal parallax barrier panel disposed over a display panel, wherein:

the parallax barrier panel has a first substrate, a second substrate, liquid crystal sandwiched between the first substrate and the second substrate, the second substrate has first barrier electrode extending in a first direction and arranged at a first pitch in a second direction, and second barrier electrode extending in the first direction, and insulating film disposed between the first barrier electrode and the second barrier electrode, the first barrier electrode is electrically connected to the second barrier electrode, a first bus line extends in the second direction along a first side of the second substrate, a second bus line extends in the second direction along a second side opposite to the first side of the second substrate, a bus lead wire connected to the terminal and extending in the first direction, the first barrier electrode and the second barrier electrode are connected to the first bus line and the second bus line, the first bus line and the second bus line are electrically connected to each other, the bus lead wire is connected to the first bus line and the second bus line via a branch point, the first bus line is in the same layer as the bus lead wire at the branch point and extending along the first side in the second direction, and the second bus line and the bus lead wire are connected to each other via a bridge that is provided between the branch point and the second bus line and that is in a different layer than the second bus line.

6. The three-dimensional display device according to claim 5, wherein the bridge is indium tin oxide.

* * * * *